United States Patent
Smith et al.

(10) Patent No.: US 11,814,239 B2
(45) Date of Patent: Nov. 14, 2023

(54) HEATING OF PRODUCTS IN AN AEROSOL DISPENSER AND AEROSOL DISPENSER CONTAINING SUCH HEATED PRODUCTS

(71) Applicant: The Procter & Gamble Company, Cincinnati, OH (US)

(72) Inventors: Scott Edward Smith, Cincinnati, OH (US); Douglas Bruce Zeik, Liberty Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/444,356

(22) Filed: Feb. 28, 2017

(65) Prior Publication Data

US 2017/0166391 A1    Jun. 15, 2017

Related U.S. Application Data

(63) Continuation-in-part of application No. 14/061,149, filed on Oct. 23, 2013, now Pat. No. 9,296,550, and
(Continued)

(51) Int. Cl.
*B65D 83/38* (2006.01)
*B65D 83/32* (2006.01)
(Continued)

(52) U.S. Cl.
CPC .............. *B65D 83/38* (2013.01); *B65D 83/14* (2013.01); *B65D 83/32* (2013.01); *B65D 83/48* (2013.01);
(Continued)

(58) Field of Classification Search
CPC ........ B65D 83/70; B65D 83/72; B65D 83/38; B65D 83/62; B65D 83/14; B65D 83/32;
(Continued)

(56) References Cited

U.S. PATENT DOCUMENTS 2,863,699 A    12/1959    Elser
3,074,602 A    1/1963    Charlton et al.
(Continued)

FOREIGN PATENT DOCUMENTS

CN    105550731 A    5/2016
DE    2336889 A1    4/1974
(Continued)

OTHER PUBLICATIONS

Spray Technology & Marketing, Apr., 2009; Scott Smith; 6 Pages Downlaoded Dec. 19, 2013; http://www.spraytm.com/expanding-the-aerosol-marketplace-through-plastic-innovation.html.
(Continued)

*Primary Examiner* — Bob Zadeh
(74) *Attorney, Agent, or Firm* — William E. Gallagher; Sarah M. Decristofaro (57) ABSTRACT

A method of warming food dispensable from an aerosol dispenser. The aerosol dispenser is made from materials which can go into a single recycling stream having a single class of materials, as defined by the Society of the Plastics Industry, and particularly may exclusively comprise Class 1 materials suitable for eating in a microwave oven. Consumer products, such as food, contained in the aerosol dispenser may be heated in a microwave oven prior to dispensing. Upon dispensing, food retains residual heat, and is suitable for eating or further cooking. Other heated products in the aerosol dispenser may be comfortably applied to the skin, used as air freshener, used for cleaning, etc. The aerosol dispenser may have indicia indicating the aerosol dispenser is suitable for microwave heating. The aerosol dispenser can have indicia indicating the aerosol dispenser is suitable for heating in a microwave oven. The indicia may be thermochromic, indicating when a desired temperature has been reached. The aerosol dispenser can have a safety valve, to
(Continued)

safely relieve product and/or propellant pressure upon overpressurization in a microwave oven. The safety valve may be single use or reusable.

10 Claims, 4 Drawing Sheets

Related U.S. Application Data a continuation-in-part of application No. 13/108,198, filed on May 16, 2011, now Pat. No. 9,701,430.

(51) Int. Cl.
| | |
|---|---|
| *B65D 83/48* | (2006.01) |
| *B65D 83/62* | (2006.01) |
| *B65D 83/70* | (2006.01) |
| *B65D 83/72* | (2006.01) |
| *B65D 83/14* | (2006.01) |

(52) U.S. Cl.
CPC ............. *B65D 83/62* (2013.01); *B65D 83/70* (2013.01); *B65D 83/72* (2013.01); *B65D 83/752* (2013.01); *Y02W 30/80* (2015.05)

(58) Field of Classification Search
CPC ..... B65D 83/48; B65D 83/752; Y02W 30/80; G01K 11/12
See application file for complete search history.

(56) References Cited

U.S. PATENT DOCUMENTS

| | | | |
|---|---|---|---|
| 3,079,253 A | 2/1963 | Greig | |
| 3,083,854 A | 4/1963 | Lusher | |
| 3,282,510 A | 11/1966 | Schwartz | |
| 3,283,960 A | 11/1966 | Williams | |
| 3,292,826 A | 12/1966 | Henry | |
| 3,333,743 A | 8/1967 | Charles | |
| 3,372,827 A | 3/1968 | Altschuler | |
| 3,403,804 A | 10/1968 | Colombo | |
| 3,405,838 A | 10/1968 | Preisendanz | |
| 3,450,254 A | 6/1969 | Miles | |
| 3,515,308 A | 6/1970 | Hayes et al. | |
| 3,675,824 A * | 7/1972 | Hein | B05B 7/2424 |
| | | | 222/145.7 |
| 3,724,727 A | 4/1973 | Zundel | |
| 3,815,534 A | 6/1974 | Kneusel | |
| 3,880,187 A | 4/1975 | Kneusel | |
| 3,896,602 A | 7/1975 | Petterson | |
| 3,912,130 A | 10/1975 | Pelton | |
| 3,918,610 A | 11/1975 | Willis | |
| 4,028,118 A * | 6/1977 | Nakasuji | C08K 5/0041 |
| | | | 106/31.19 |
| 4,073,398 A | 2/1978 | Schultz | |
| RE30,093 E | 9/1979 | Burger | |
| 4,330,066 A | 5/1982 | Berliner | |
| 4,350,272 A * | 9/1982 | Petterson | B65D 83/62 |
| | | | 222/386.5 |
| 4,513,874 A | 4/1985 | Mulawski | |
| 4,736,083 A * | 4/1988 | Saville | B01J 19/126 |
| | | | 137/197 |
| 4,878,588 A * | 11/1989 | Ephraim | A61J 9/02 |
| | | | 215/11.2 |
| 4,916,386 A * | 4/1990 | Schulz | G01R 21/04 |
| | | | 324/106 |
| 4,964,540 A | 10/1990 | Katz | |
| 5,078,924 A * | 1/1992 | Spinello | A61L 11/00 |
| | | | 264/500 |
| 5,111,971 A | 5/1992 | Winer | |
| 5,137,179 A * | 8/1992 | Stoffel | B65D 83/62 |
| | | | 215/3 |
| 5,152,411 A * | 10/1992 | Pope | B65D 23/00 |
| | | | 215/381 |
| 5,199,615 A * | 4/1993 | Downing | B65D 83/38 |
| | | | 222/397 |
| 5,202,677 A * | 4/1993 | Parker | G01K 11/12 |
| | | | 40/448 |
| 5,206,062 A * | 4/1993 | Amemiya | B65D 83/38 |
| | | | 428/35.7 |
| 5,219,005 A | 6/1993 | Stoffel | |
| 5,224,630 A | 7/1993 | Pope et al. | |
| 5,248,063 A | 9/1993 | Abbott | |
| 5,346,659 A * | 9/1994 | Buhler | B29C 45/38 |
| | | | 264/154 |
| 5,553,753 A * | 9/1996 | Abplanalp | B65D 83/38 |
| | | | 222/387 |
| 5,573,043 A * | 11/1996 | Fuehrer | B65B 31/003 |
| | | | 141/20 |
| 5,586,695 A | 12/1996 | Labus | |
| 5,668,097 A | 9/1997 | Trinh et al. | |
| 5,783,544 A | 7/1998 | Trinh et al. | |
| 5,927,551 A | 7/1999 | Taylor et al. | |
| 6,019,252 A | 2/2000 | Benecke et al. | |
| 6,040,565 A | 3/2000 | Aakerlind | |
| 6,186,374 B1 * | 2/2001 | Gross | B65D 47/0838 |
| | | | 222/494 |
| 6,196,275 B1 | 3/2001 | Yazawa et al. | |
| 6,248,135 B1 | 6/2001 | Trinh et al. | |
| 6,253,970 B1 | 7/2001 | Kohn et al. | |
| 6,254,820 B1 | 7/2001 | Cornell | |
| 6,299,368 B1 | 10/2001 | Tavularis | |
| 6,499,311 B2 * | 12/2002 | Mahajan | B29C 49/0073 |
| | | | 62/371 |
| 7,028,866 B2 | 4/2006 | Kunesh et al. | |
| 7,182,941 B2 | 2/2007 | Trinh et al. | |
| 7,303,087 B2 | 12/2007 | Flashinski et al. | |
| 7,387,121 B2 | 6/2008 | Harvey | |
| 7,451,899 B2 | 11/2008 | De Pous | |
| 7,757,902 B2 | 7/2010 | Bevans et al. | |
| 7,971,759 B2 | 7/2011 | Dalan et al. | |
| 8,025,189 B2 | 9/2011 | Salameh | |
| 8,074,847 B2 | 12/2011 | Smith | |
| 8,096,327 B2 | 1/2012 | Hirz | |
| 8,464,914 B2 | 6/2013 | Lulla et al. | |
| 8,505,762 B2 | 8/2013 | Holbach et al. | |
| 8,511,522 B2 | 8/2013 | Chan et al. | |
| 8,631,632 B2 | 1/2014 | Morales et al. | |
| 8,752,731 B2 | 6/2014 | Nimmo | |
| 8,844,584 B2 | 9/2014 | Haley et al. | |
| 8,844,765 B2 | 9/2014 | Tryon | |
| 8,869,842 B2 | 10/2014 | Smith et al. | |
| 9,061,795 B2 | 6/2015 | Girardot et al. | |
| 9,132,955 B2 | 9/2015 | Smith et al. | |
| 9,174,229 B2 | 11/2015 | Smith et al. | |
| 9,296,550 B2 * | 3/2016 | Smith | B65D 83/14 |
| 9,334,103 B2 | 5/2016 | Soliman | |
| 9,394,098 B2 | 7/2016 | Kohls et al. | |
| 9,505,509 B2 | 11/2016 | Smith | |
| 9,758,294 B2 * | 9/2017 | McDaniel | B29B 11/14 |
| 9,919,862 B2 * | 3/2018 | Smith | B65D 83/38 |
| 2001/0008238 A1 * | 7/2001 | Witonsky | H05B 6/6408 |
| | | | 219/729 |
| 2002/0005044 A1 * | 1/2002 | Mahajan | B29C 49/0073 |
| | | | 62/457.3 |
| 2002/0182319 A1 * | 12/2002 | Ben-Malek | B05D 1/62 |
| | | | 427/237 |
| 2003/0015507 A1 * | 1/2003 | Miller | B23K 26/08 |
| | | | 219/121.68 |
| 2003/0181917 A1 * | 9/2003 | Gertner | A61M 35/003 |
| | | | 606/82 |
| 2004/0055602 A1 * | 3/2004 | Riebe | A61M 15/009 |
| | | | 128/205.24 |
| 2005/0258172 A1 * | 11/2005 | Gueret | H05B 6/80 |
| | | | 219/732 |
| 2006/0231109 A1 * | 10/2006 | Howell | G16H 40/63 |
| | | | 600/300 |
| 2006/0241355 A1 * | 10/2006 | Howell | A61B 5/01 |
| | | | 600/300 |
| 2007/0245538 A1 | 10/2007 | Salameh | |
| 2007/0267447 A1 * | 11/2007 | Kennedy | B65D 83/752 |
| | | | 222/394 |

(56) References Cited

U.S. PATENT DOCUMENTS

| | | | |
|---|---|---|---|
| 2007/0284369 A1 | 12/2007 | Murray | |
| 2007/0284390 A1* | 12/2007 | Wang | B65D 83/687 222/1 |
| 2008/0017671 A1* | 1/2008 | Shieh | B65D 83/752 222/394 |
| 2008/0078759 A1 | 4/2008 | Wnek | |
| 2008/0105711 A1* | 5/2008 | Kirimli | B67D 1/0462 222/209 |
| 2008/0217583 A1* | 9/2008 | Hayes | C09D 7/61 252/301.35 |
| 2008/0229971 A1* | 9/2008 | Wolfe | C09D 11/03 106/31.13 |
| 2008/0257883 A1 | 10/2008 | Van Hove et al. | |
| 2008/0272145 A1 | 11/2008 | Nimmo et al. | |
| 2008/0307587 A1* | 12/2008 | Shah | D06P 1/5264 8/441 |
| 2008/0314475 A1 | 12/2008 | Fransen | |
| 2009/0014679 A1* | 1/2009 | Hygema | B65D 83/565 251/368 |
| 2009/0024082 A1 | 1/2009 | McLean et al. | |
| 2009/0045222 A1 | 2/2009 | Nimmo et al. | |
| 2009/0068385 A1 | 3/2009 | Hill | |
| 2009/0236363 A1 | 9/2009 | Haley | |
| 2010/0181387 A1* | 7/2010 | Zaffaroni | A61M 15/06 239/13 |
| 2010/0239799 A1 | 9/2010 | Van Hove et al. | |
| 2010/0264165 A1 | 10/2010 | Hansen et al. | |
| 2010/0330313 A1 | 12/2010 | Van Hove et al. | |
| 2011/0009175 A1* | 1/2011 | Raichman | A63H 3/36 463/1 |
| 2011/0017701 A1 | 1/2011 | Soliman | |
| 2011/0024450 A1 | 2/2011 | Maas et al. | |
| 2011/0083955 A1 | 4/2011 | Tirtowidjojo | |
| 2011/0101036 A1* | 5/2011 | Wanbaugh | B05B 11/3047 222/402.1 |
| 2011/0192865 A1 | 8/2011 | Jung | |
| 2011/0248035 A1 | 9/2011 | Peirsman | |
| 2011/0259359 A1* | 10/2011 | Groh | B65D 47/248 132/290 |
| 2012/0034173 A1* | 2/2012 | Batt | A61Q 5/06 424/47 |
| 2012/0132607 A1 | 5/2012 | Landman et al. | |
| 2012/0157779 A1 | 6/2012 | Fischvogt | |
| 2012/0187067 A1 | 7/2012 | Maas et al. | |
| 2012/0202025 A1* | 8/2012 | Butzloff | B29C 65/04 428/212 |
| 2013/0043209 A1 | 2/2013 | Wurster et al. | |
| 2013/0068243 A1* | 3/2013 | Birkel | A61Q 5/06 132/210 |
| 2013/0253452 A1 | 9/2013 | Klofta | |
| 2013/0270295 A1 | 10/2013 | Collias et al. | |
| 2014/0209633 A1* | 7/2014 | Mcdaniel | B29B 11/14 222/95 |
| 2014/0370160 A1* | 12/2014 | Martin | B32B 7/12 426/110 |
| 2015/0001256 A1 | 1/2015 | Kohls et al. | |
| 2015/0108163 A1 | 4/2015 | Smith et al. | |
| 2015/0114493 A1 | 4/2015 | Park | |
| 2017/0166391 A1* | 6/2017 | Smith | B65D 83/38 |
| 2017/0183137 A1 | 6/2017 | Walton et al. | |
| 2018/0244460 A1* | 8/2018 | Zeik | B65D 83/70 |

FOREIGN PATENT DOCUMENTS

| | | | | |
|---|---|---|---|---|
| EP | 0399793 A2 | * | 11/1990 | ............ B65D 83/38 |
| EP | 0556512 A1 | | 8/1993 | |
| GB | 2184491 A | | 6/1987 | |
| GB | 2554745 A | * | 4/2018 | ............ B65D 83/38 |
| JP | 08133362 A | | 5/1996 | |
| JP | 2000118581 A | | 4/2000 | |
| JP | 2000136900 A | | 5/2000 | |
| JP | 2005162231 A | | 6/2005 | |
| JP | 5945938 B2 | | 7/2016 | |
| JP | 6057148 B2 | | 1/2017 | |
| WO | WO 91/08099 A1 | | 6/1991 | |
| WO | 9508493 A1 | | 3/1995 | |
| WO | 03025522 A1 | | 3/2003 | |
| WO | WO 2007/140398 A2 | | 12/2007 | |

OTHER PUBLICATIONS

U.S. Appl. No. 15/444,354, filed Feb. 28, 2017, Smith, et al.
PCT Search Report; PCT/US2018/018464; 31 Pages; dated May 17, 2018.
PCT Search Report; PCT/US2018/018465; 26 Pages; dated May 17, 2018.
Office Action dated Apr. 12, 2018, U.S. Appl. No. 15/444,354.
Office Action dated Nov. 13, 2018, U.S. Appl. No. 15/444,354.

* cited by examiner

HEATING OF PRODUCTS IN AN AEROSOL DISPENSER AND AEROSOL DISPENSER CONTAINING SUCH HEATED PRODUCTS

FIELD OF THE INVENTION

The present invention relates to aerosol dispensers for dispensing heated products.

BACKGROUND OF THE INVENTION

Aerosol dispensers are well known in the art. Aerosol dispensers typically comprise an outer container which acts as a frame for the remaining components and as a pressure vessel for propellant and product contained therein. Outer containers made of metal are well known in the art. However, metal containers can be undesirable due to high cost and limited recyclability. Attempts to use plastic have occurred in the art. Relevant attempts in the art to employ plastic in aerosol dispensers are found in U.S. Pat. Nos. 2,863,699; 3,333,743; 9,296,550; 9,334,103 and 2009/0014679.

The outer containers are typically, but not necessarily, cylindrical. The outer container may comprise a bottom for resting on horizontal surfaces such as shelves, countertops, tables etc. The bottom of the outer container may comprise a re-entrant portion as shown in U.S. Pat. No. 3,403,804 or base cup as shown in U.S. Pat. No. 9,061,795. Sidewalls defining the shape of the outer container extend upwardly from the bottom to an open top.

The open top defines a neck for receiving additional components of the aerosol dispenser. The industry has generally settled upon a nominal neck diameter of 2.54 cm, for standardization of components among various manufacturers, although smaller diameters, such as 20 mm, are also used. Various neck shapes are shown in U.S. Pat. Nos. 6,019,252; 7,028,866; 7,279,207 and 7,303,087.

Typically a valve cup is inserted into the neck. The valve cup is sealed against the neck to prevent the escape of the propellant and loss of pressurization, such as described in U.S. Pat. Nos. 8,074,847; 8,096,327; 8,844,765 and 8,869,842. The valve cup holds the valve components which are movable in relationship to the balance of the aerosol dispenser. Suitable valves are shown in commonly assigned U.S. Pat. Nos. 8,511,522 and 9,132,955. When the valves are opened, product may be dispensed through a nozzle, etc. as described in commonly assigned 9,174,229.

A valve may be inserted into the valve cup for selective actuation by the user. The valve is typically normally closed, but may be opened to create a flow path for the product to ambient or a target surface. The valve may be compatible with local recycling standards. Suitable valves are disclosed in commonly assigned U.S. Pat. Nos. 8,511,522 and 9,132,955.

If a valve is to be assembled into an aerosol, typically the valve cup is crimped onto the neck of the aerosol container. But this operation is expensive and is difficult to perform with a plastic valve cup. A separate interlock may be used to attach a valve to a valve cup, particularly a plastic valve and plastic valve cup are used. Suitable interlocks include bayonet fittings and threads as disclosed in commonly assigned P&G Case 14458, Ser. No. 15/235,237, filed Aug. 12, 2016. A pressure vessel with a threaded bore is proposed in 8,505,762.

A bag may be used to contain product for selective dispensing by a user. Dispensing of product from the bag occurs in response to the user actuating the valve. The bag separates product within the bag from propellant disposed between the bag and container. This bag limits or even prevents intermixing of the contents of the bag and the components outside of the bag. Thus, product may be contained in the bag. Propellant may be disposed between the outside of the bag and the inside of the outer container. Upon actuation of the valve, a flow path out of the bag is created. This embodiment is commonly called a bag in can and may be used, for example, in dispensing shaving cream gels. Alternatively, a bag may be directly joined to the valve housing, in a configuration commonly called a bag on valve. A suitable bag configuration is disclosed in commonly assigned P&G Case 14458, Ser. No. 15/235,227, filed Aug. 12, 2016 which teaches attaching a bag to a valve cup.

If a bag configuration is desired, propellant may be disposed between the bag and outer container, as disclosed in commonly assigned U.S. Pat. Nos. 8,631,632 and 8,869,842. Afterwards, product fill may occur in a separate, remote, operation, optionally carried out in another location, which may be in the same country or in a different country. Such a manufacturing process can conserve costs in production, shipment and/or storage.

An aerosol container having a bag therein may be made from a dual layer preform, having plural layers disposed one inside the other. Relevant attempts include U.S. Pat. Nos. 3,450,254; 4,330,066; 6,254,820; RE 30093 E; WO 9108099 and US 2011/0248035 A1. But each of these attempts requires a separate operation to attach the bag to the relevant component. Each attachment step takes time in manufacturing and creates the opportunity for leakage if not correctly performed. Improvements in dual layer preforms are found in commonly assigned P&G Case 14461, application Ser. No. 15/235,279, filed Aug. 12, 2016.

Alternatively, a dip tub may be used if intermixing of the product and propellant is desired. When the user actuates the valve, the product and propellant are dispensed together through the dip tube. One configuration is shown in commonly assigned 6,039,222. This embodiment may utilize a dip tube. The dip tube takes the product and propellant mixture from the bottom of the outer container. Or a piston may be used to expel product, if it is particularly viscous, as described in commonly assigned 2016/0368633.

But aerosol dispensers have typically been used to dispense products which can be used independent of the product temperature. For example, aerosol dispensers are commonly used to dispense cleaning products, insecticide, air fresheners, shaving cream, etc. These products are ubiquitously dispensed at the temperature ambient to the aerosol dispenser, typically room temperature.

But room temperature may not be optimum for all products. Some products may be more optimally used in a warmed or heated condition, the terms being used interchangeably. For example, certain foods are more palatable when served warm. Air freshener may disperse better when warmed. Shaving cream may be perceived to be more comfortable when warmed.

But it is too time consuming to place an aerosol dispenser in an electric or gas oven and not only wait for this oven to heat up, but also for the contents of the aerosol dispenser to then become heated. And a large oven is not efficient for heating a small aerosol dispenser.

Accordingly, it is an object of this invention to provide an aerosol dispenser which can be efficiently, safely and quickly heated to provide warm product upon dispensing.

SUMMARY OF THE INVENTION

The invention comprises an aerosol dispenser. The aerosol dispenser may be made from materials which are microwavable, allowing warming in a microwave oven. Such warming allows the product therein to be sprayed in a heated condition. The aerosol dispenser may further comprise or have one or more indicia associated therewith. Such indicia may be thermochromic, designating a particular temperature has been reached. The indicia may indicate to a user that the aerosol dispenser is microwavable and further provide instructions for use. The aerosol dispenser may comprise, exclusively comprise, consist essentially of or consist of Class 1 materials, with no flammable materials present. The aerosol dispenser may further comprise a safety valve to prevent catastrophic explosion upon overheating. The safety valve may be single use or reusable.

BRIEF DESCRIPTION OF THE DRAWINGS

FIGS. 1-2B are drawn to scale, except for the safety valves and indicia which are shown schematically.

DETAILED DESCRIPTION OF THE INVENTION

Figure 1:
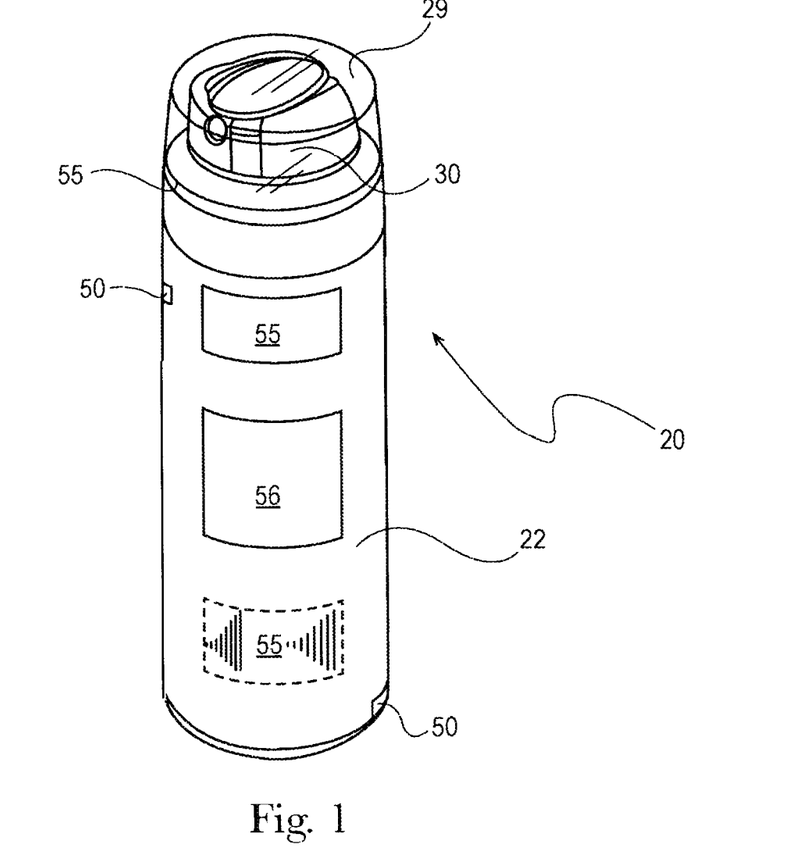
FIG. 1 is a perspective view of an aerosol dispenser according to the present invention.
Figure 2A:
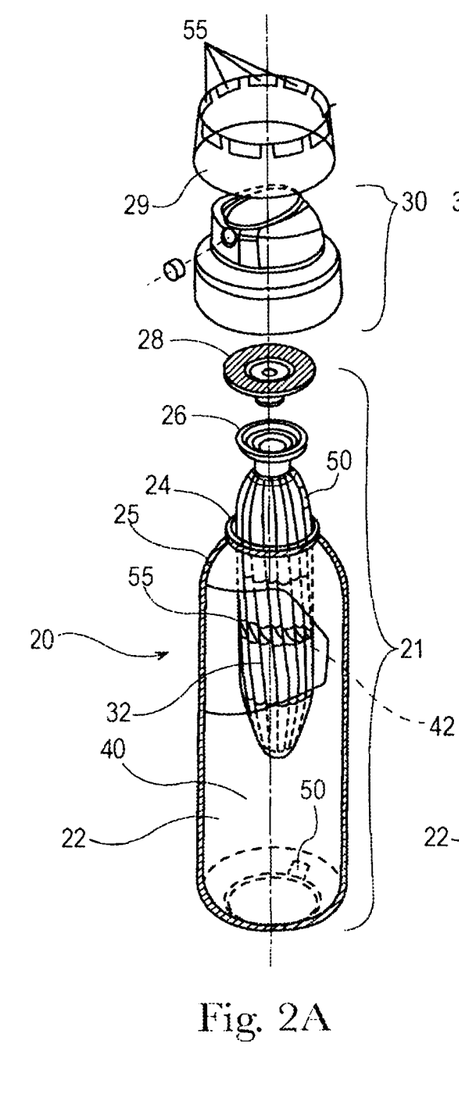
FIG. 2A is an exploded perspective view of an aerosol dispenser having a collapsible bag, shown partially in cutaway and having the optional safety valve omitted for clarity.
Figure 2B:
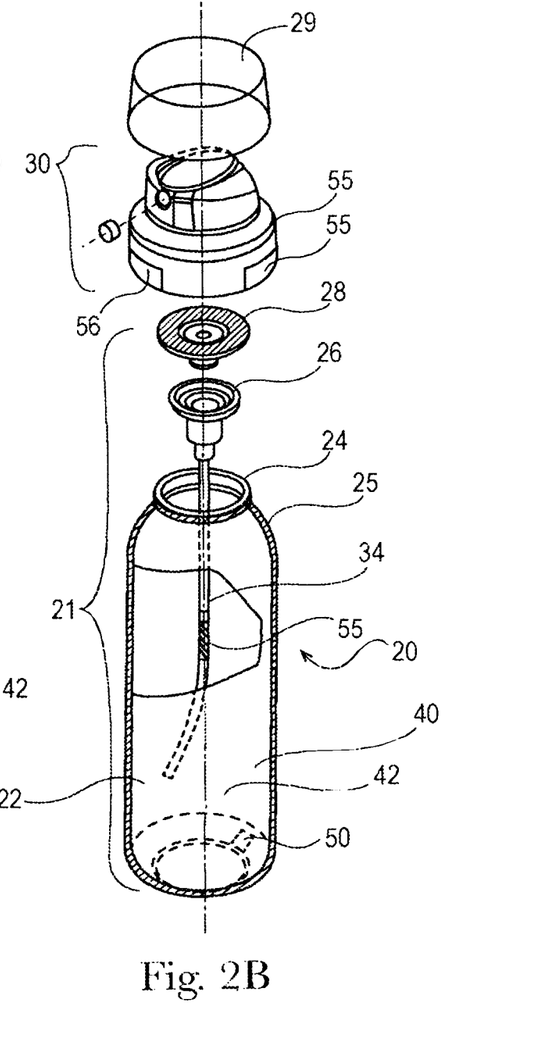
FIG. 2B is an exploded perspective view an aerosol dispenser having a dip tube, shown partially in cutaway and having the optional safety valve omitted for clarity.

Referring to FIGS. 1, 2A and 2B, an aerosol dispenser 20 is shown. The aerosol dispenser 20 comprises a pressurizable outer container 22 usable for such a dispenser. The outer container 22 may comprise plastic or metal, as are known in the art. The outer container 22 may have an opening. The opening is typically at the top of the pressurizable container when the pressurizable container is in its-in use position. The opening defines a neck 24, to which other components may be sealed. An optional safety valve 50 may be used to prevent over-pressurization and unexpected failure.

A valve cup 26 may be sealed to the opening of the outer container 22, as described in further detail below. The valve cup 26 may be sealed to the neck of the outer container 22 using the same class of materials which is selected for the other components of the aerosol dispenser. Recycling class 1 thermoplastic elastomer [TPE] may be selected for the seal material.

The TPE material may be selected to be resistant to the propellant 40 and/or product 42 desired for use. A hydrophilic TPE-E based compound formulated to provide adhesion to PET and chemical resistance to silicone oil may be used as one or more components in the aerosol dispenser 20. Class 1 TPE material sold by Kraiburg TPE GmbH & Co KG of Waldkraiburg, Germany under the name Hcc8791-52 may be suitable.

A dispensing valve assembly 28, in turn, may be disposed within the valve cup 26. The dispensing valve assembly 28 provides for retention of product 42 within the aerosol dispenser 20 until the product 42 is selectively dispensed by a user 65. The dispensing valve assembly 28 may be selectively actuated by an actuator 30. A suitable subcombination 21 may comprise the outer container 22, valve cup 26, dispensing valve assembly 28, and any product 42 or propellant 40 therein. Generally, an aerosol dispenser 20 having metal components is unsuitable for use in a microwave oven. Thus the aerosol dispenser 20 according to the present invention may be entirely polymeric and particularly entirely Stream 1 as defined by the Society of Plastics Engineers. If desired, the indicia 55, trademark 56 and/or safety valve 50 disclosed herein may be used on such a subcombination.

Selective actuation of the dispensing valve assembly 28 allows the user 65 to dispense a desired quantity of the product 42 on demand. Illustrative and nonlimiting products 42 for use with the present invention may include shave cream, shave foam, body sprays, body washes, perfumes, cleansers, air fresheners, astringents, foods, paints, etc.

Inside the outer container 22 may be a product delivery device. The product delivery device may comprise a collapsible bag 32 as shown in FIG. 2A. The collapsible bag 32 may be mounted in sealing relationship to the neck 24 of the container and/or to the dispensing valve assembly 28. This arrangement is known in the art as a bag-on-valve. The collapsible bag 32 may hold product 42 therein, and prevent intermixing of such product 42 with propellant 40. The propellant 40 may be stored outside the collapsible bag 32, and inside the outer container 22.

The collapsible bag 32 may expand upon being charged with product 42. Such expansion decreases the available volume inside the outer container 22. Decreasing the available volume increases the pressure of any propellant 40 therein according to Boyles law.

The product delivery device may alternatively or additionally comprise a dip tube 34 as shown in FIG. 2B. The dip tube 34 extends from a proximal end sealed to the dispensing valve assembly 28. The dip tube 34 may terminate at a distal end juxtaposed with the bottom of the outer container 22. This embodiment provides for intermixing of the product 42 and propellant 40. Both are co-dispensed in response to selective actuation of the dispensing valve assembly 28 by a user 65. Again, insertion of product 42 and/or propellant 40 into the outer container 22 increases pressure therein according to Boyles law.

Referring to FIGS. 2A, 2B, the aerosol dispensers 20, and components thereof, may have a longitudinal axis, and may optionally be axi-symmetric with a round cross section. Alternatively, the outer container 22, product delivery device, dispensing valve assembly 28, etc., may be eccentric and have a square, elliptical or other cross section.

Once the aerosol dispenser is manufactured, shipped to retail, sold to and used by the consumer, the product in the aerosol dispenser is eventually depleted. Upon depletion, the aerosol dispenser is typically discarded. Being discarded increases landfill and fails to recycle potentially usable materials. Recycling presents an opportunity to reduce landfill, conserve energy and reuse raw materials in another aerosol dispenser or in other products. But recycling presents its own challenges.

Yet other recycling problems include separation of various material from a consumer package goods, such as an aerosol dispenser, into reusable material steams. The Society of the Plastics Industry [SPI] has developed a widely used resin identification system. The SPI system divides resins into seven classes, as set forth in below. The listing below shows each class of polymer has different melting temperatures [Tm, degrees C.], glass transition temperatures [Tg, degrees C.] and Young's moduli [YM, GPa].

Figure 4A:
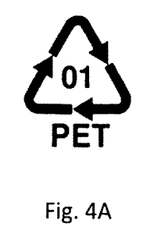
FIG. 4A is a recycling symbol used to represent polyethylene terephthalate.
Figure 4B:
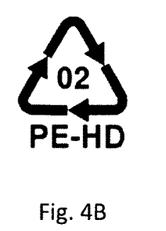
FIG. 4B is a recycling symbol used to represent high-density polyethylene.
Figure 4C:
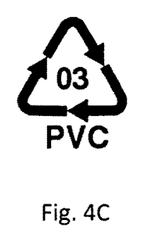
FIG. 4C is a recycling symbol used to represent polyvinyl chloride.
Figure 4D:
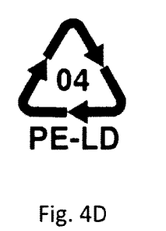
FIG. 4D is a recycling symbol used to represent low-density polyethylene.
Figure 4E:
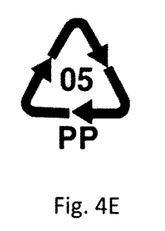
FIG. 4E is a recycling symbol used to represent polypropylene.
Figure 4F:
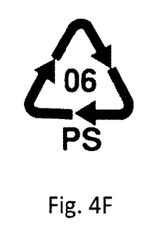
FIG. 4F is a recycling symbol used to represent polystyrene.
Figure 4G:
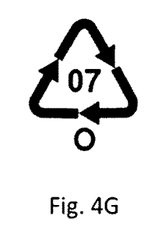
FIG. 4G is a recycling symbol used to represent other materials.

Polyethylene Terephthalate (PET, PETE)
Clarity, strength, toughness, barrier to gas and moisture.
Soft drink, water and salad dressing bottles; peanut butter and jam jars
Tm=250; Tg=76
YM=2-2.7
See FIG. 4A.
High-Density Polyethylene (HDPE)
Stiffness, strength, toughness, resistance to moisture, permeability to gas.
Water pipes, hula hoop rings, five gallon buckets, milk, juice and water bottles; grocery bags, some shampoo/toiletry bottles
Tm=130; Tg=−125
YM=0.8
See FIG. 4B.
Polyvinyl Chloride (PVC)
Versatility, ease of blending, strength, toughness.
Blister packaging for non-food items; cling films for non-food use. Not used for food packaging as the plasticisers needed to make natively rigid PVC flexible are usually toxic. Non-packaging uses are electrical cable insulation; rigid piping; vinyl records.
Tm=240; Tg=85
YM=2.4-4.1
See FIG. 4C.
Low-Density Polyethylene (LDPE)
Ease of processing, strength, toughness, flexibility, ease of sealing, barrier to moisture.
Frozen food bags; squeezable bottles, e.g. honey, mustard; cling films; flexible container lids.
Tm=120; Tg=−125
YM=0.17-0.28
See FIG. 4D.
Polypropylene (PP)
Strength, toughness, resistance to heat, chemicals, grease and oil, versatile, barrier to moisture.
Reusable microwaveable ware; kitchenware; yogurt containers; margarine tubs; microwaveable disposable take-away containers; disposable cups; plates.
Tm=173; Tg=−10
YM=1.5-2
See FIG. 4E.
Polystyrene (PS)
Versatility, clarity, easily formed
Egg cartons; packing peanuts; disposable cups, plates, trays and cutlery; disposable take-away containers;
Tm=240 (only isotactic); Tg=100 (atactic and isotactic)
YM=3-3.5
See FIG. 4F.
Other (often polycarbonate or ABS)
Dependent on polymers or combination of polymers
Beverage bottles; baby milk bottles. Non-packaging uses for polycarbonate: compact discs; "unbreakable" glazing; electronic apparatus housings; lenses including sunglasses, prescription glasses, automotive headlamps, riot shields, instrument panels;
Polycarbonate: Tg=145; Tm=225
Polycarbonate: YM=2.6; ABS plastics: YM=2.3
See FIG. 4G.

As such, it is reported that separation of the recycled materials into different classes must be efficient, because even small amounts of the wrong time of resin can be detrimental to the recycling mix. http://en.wikipedia.org/wiki/Resin identification code. Complicating the matter, not all classes of materials are recycled in every community. Confusion can occur as to which materials can be recycled and which material cannot be recycled.

For these reasons, and others, plastic aerosol containers must be constructed to meet the longstanding aerosol needs and to be conveniently recyclable. Such construction must go beyond the outer container which typically is the component having the largest single gram weight. Such construction must further consider the minor components and even the propellant. Accordingly, a new approach is needed.

The outer container 22 may comprise a plastic pressurizable container. The plastic may be polymeric, and particularly comprise PET. The dispensing valve assembly 28, and optional valve cup 26 may be welded to the neck 24 of the outer container 22, as discussed below. The valve cup 26 may be clinched to the neck 24 in known fashion.

Any number of known valve assemblies 28 may be usable with the present invention. One suitable and non-limiting example, is shown. In this example, a rigid sleeve 54 may be attached to the top of the bag with an impermeable seal. An elastically deformable plug may be tightly inserted into the sleeve 54. Longitudinal movement of the plug, in the downward direction and within the sleeve 54 may allow product 42 to be selectively dispensed. The sleeve 54 may be impermeably joined to an optional valve cup 26. The valve cup 26, in turn, may be joined to the neck 24 of the outer container 22. A suitable plug and sleeve 54 type dispensing valve assembly 28 may be made according to the teachings of commonly assigned publications 2010/0133301A1 and/or 2010/0133295A1.

The pressurizable container may further include a propellant 40. The propellant 40 may be disposed between the outer container 22 and the product delivery device. Alternatively propellant 40 may be disposed in the outer container 22 and/or the collapsible bag 32. Typically the pressure in the outer container 22 is greater than the pressure in the collapsible bag 32, so that product 42 may be dispensed from within the bag. If a dip tube 34 is selected for the product delivery device, the propellant 40 and product 42 may be intermixed, and thus co-dispensed. The pressure of the propellant 40 within the outer container 22 provides for dispensing of the product 42/co-dispensing of product 42/propellant 40 to ambient, and optionally to a target surface. The target surface may include a surface to be cleaned or otherwise treated by the product 42, skin, etc. Such dispensing occurs in response to the user 65 actuating the dispensing valve assembly 28.

Examining the components in more detail, the pressurizable container may comprise an outer container 22 having a hole with a valve cup 26 therein or disposable therein. A user 65 activated dispensing valve assembly 28 may be disposed in the valve cup 26. A product delivery device may be joined to the valve cup 26. Propellant 40 may be disposed between the outer container 22 and the product delivery device. The product 42 and propellant 40 may be separately dispensed or may be dispensed together.

If the product delivery device comprises a flexible, collapsible bag 32, the pressure boundary for the propellant 40 is formed, in part, by the collapsible bag 32. If the product delivery device comprises a dip tube 34, the pressure boundary for the propellant 40 is formed, in part by the underside of the dispensing valve assembly 28 when the valve 28 is closed.

If desired, the outer container 22, valve cup 26, dispensing valve assembly 28, dip tube 34 and/or collapsible bag 32 may be polymeric. By polymeric it is meant that the component is formed of a material which is plastic, comprises polymers, and/or particularly polyolefin, polyester or nylons. Thus, the entire aerosol dispenser 20 or, specific components thereof, may be free of metal, allowing exposure to microwave energy.

If desired, the outer container 22, collapsible bag 32, and/or dip tube 34, may be transparent or substantially transparent. If both the outer container 22 and a collapsible bag 32 used as the product delivery device are transparent, this arrangement provides the benefit that the consumer knows when product 42 is nearing depletion and allows improved communication of product 42 attributes, such as color, viscosity, etc. Also, labeling or other decoration of the container may be more apparent if the background to which such decoration is applied is clear. Alternatively or additionally, the outer container 22, collapsible bag 32, etc. may be transparent and colored with like or different colors.

The outer container 22 may define a longitudinal axis of the aerosol dispenser 20. The outer container 22 may be axisymmetric as shown, or, may be eccentric. While a round cross-section is shown, the invention is not so limited. The cross-section may be square, elliptical, irregular, etc. Furthermore, the cross section may be generally constant as shown, or may be variable. If a variable cross-section is selected, the outer container 22 may be barrel shaped, hourglass shaped, or monotonically tapered.

The outer container 22 may range from 6 to 40 cm in height, taken in the axial direction and from 4 to 60 cm in diameter if a round footprint is selected. The outer container 22 may have a volume ranging from 115 to 1000 cc exclusive of any components therein, such as a product delivery device. The outer container 22 may be injection stretch blow molded. If so, the injection stretch blow molding process may provide a stretch ratio of greater than 8, 8.5, 9, 9.5, 10, 12, 15 or 20.

The outer container 22 may sit on a base. The base is disposed on the bottom of the outer container 22 and of the aerosol dispenser 20. Suitable bases include petaloid bases, champagne bases, hemispherical or other convex bases used in conjunction with a base cup. Or the outer container 22 may have a flat base with an optional punt.

A punt is a concavity in the bottom of the container and extending towards the neck 24 of the container. A punt is distinguishable from a general concavity in the bottom of a container, as a punt has a smaller diameter than is defined by the footprint of the bottom of the container. The punt may be axisymmetric about the longitudinal axis. The vertex of the punt may be coincident the longitudinal axis.

The outer container 22 sidewall also defines a diameter. The sidewall and bottom of the container may be connected by a chamfer. As used herein a chamfer refers to an angled wall which is substantially flat as taken in the radial direction. The chamfer may be angled, relative to the longitudinal axis, at least 30, 35 or 40° and not more than 60, 55 or 50°. In a degenerate case, the chamfer may be angled at 45° relative to the longitudinal axis.

If desired, the bottom of the container may comprise radially oriented internal ribs. The ribs may be of like geometry, and be spaced outwardly from the longitudinal axis. Each rib may intercept the sidewall of the outer container 22. The ribs may be equally circumferentially spaced from adjacent ribs.

It has been found that a plastic outer container 22 conforming to the aforementioned radius percentage and punt diameter to area ratio does not creep under pressures ranging from 100 to 970 kPa, and having a sidewall thickness less than 0.5 mm. The outer container 22 may be pressurized to an internal gage pressure of 100 to 970, 110 to 490 or 270 to 420 kPa. A particular aerosol dispenser 20 may have an initial propellant 40 pressure of 1100 kPA and a final propellant 40 pressure of 120 kPa, an initial propellant 40 pressure of 900 kPA and a final propellant 40 pressure of 300 kPa, an initial propellant 40 pressure of 500 kPA and a final propellant 40 pressure of 0 kPa, etc. The propellant 40 pressurizes the product 42 to a pressure greater than ambient, to provide for delivery from the aerosol dispenser 20.

The aerosol dispenser 20, as presented to a user 65 may have an initial pressure. The initial pressure is the highest pressure encountered for a particular filling operation, and corresponds to no product 42 yet being dispensed from the product delivery device. As product 42 is depleted, the outer container 22 approaches a final pressure. The final pressure corresponds to depletion of substantially all product 42, except for small residual, from the product delivery device.

Thus, a suitable outer container 22 can be made without excessive material usage and the associated cost and disposal problems associated therewith. By reducing material usage, the user 65 can be assured that excessive landfill wasted is not produced and the carbon footprint is reduced.

The outer container 22, and all other components, except the TPE seal, may comprise, consist essentially of or consist of PET, PEN, Nylon EVOH or blends thereof to meet DOT SP 14223. Such materials may be selected from a single class of recyclable materials, as set forth above by the SPI.

The invention described and claimed herein is intended for ease of recycling. Thus it is counterintuitive that the plastic material[s] used for the outer container 22, and all other components may comprise, consist essentially of or consist of only virgin material, including regrind, again to meet regulatory requirements. All components of the aerosol dispenser, including the seal, may comprise, consist essentially of or consist of materials selected exclusively, solely and only for a single class of recyclable materials as set forth above by the SPI. Particularly, class 1 materials may be exclusively, solely and only used for the aerosol dispenser 20 of the present invention.

The outer container 22 and aerosol dispenser 20 may be nonrefillable and permanently sealed to prevent reuse without destruction/gross deformation of the aerosol dispenser 20. The outer container 22 may be permanently printed with the indium "DOT SP 14223" to show compliance.

As the top of the outer container 22 is approached, the outer container 22 may have a neck 24. The neck 24 may be connected to the container sidewall by a shoulder 25. The shoulder 25 may more particularly be joined to the sidewall by a radius. The shoulder 25 may have an annular flat. The neck 24 may have a greater thickness at the top of the outer container 22 than at lower portions of the neck 24 to provide a differential thickness. Such differential thickness may be accomplished through having an internally stepped neck 24 thicknesses.

The product 42 may also be inflammable. Flammability, and the absence thereof, may be determined in accordance with the absence of a fire point per ASTM D 92, Standard Test Method for Flash and Fire Points by Cleveland Open Cup Tester.

The propellant 40 may comprise nitrogen, air and mixtures thereof. Propellant 40 listed in the US Federal Register 49 CFR 1.73.115, Class 2, Division 2.2 are also considered acceptable. The propellant 40 may particularly comprise a hydrofluoroolefin, a Trans-1,3,3,3-tetrafluoroprop-1-ene, and optionally a CAS number 1645-83-6 gas. One such propellant 40 is commercially available from Honeywell International of Morristown, New Jersey under the trade name HFO-1234ze or GWP-6.

If desired, the propellant 40 may be condensable. By condensable, it is meant that the propellant 40 transforms from a gaseous state of matter to a liquid state of matter within the outer container 22 and under the pressures encountered in use. Generally, the highest pressure occurs after the aerosol dispenser 20 is charged with product 42 but before that first dispensing of that product 42 by the user 65. A condensable propellant 40 provides the benefit of a flatter depressurization curve as product 42 is depleted during usage.

A condensable propellant 40 provides the benefit that a greater volume of gas may be placed into the container at a given pressure. Upon dispensing of a sufficient volume of product 42 from the space between the outer container 22 and the product delivery device, the condensable propellant 40 may flash back to a gaseous state of matter.

The valve cup 26 may have a valve cup 26 periphery complementary to the neck 24 periphery. At least one of the valve cup 26 and/or container neck 24 may have a channel 50 therethrough. Additionally or alternatively, the channel 50 may be formed at the interface between the valve cup 26 and container neck 24.

When the desired propellant 40 pressure is reached, the valve cup 26 may be sealed to the neck 24 or top of the outer container 22 to prevent leakage therefrom. If channel 50 are used in a location other than at the interface between the valve cup 26 and container neck 24, such channel 50 may likewise be sealed.

Sealing may occur through sonic welding or ultrasonic welding as are known in the art. Alternatively or additionally, sealing may occur through spin welding, vibration welding, adhesive bonding, laser welding, or fitting a plug into the port as are known in the art. If desired, the valve cup 26 and the outer container 22 may have identical, or closely matched, melt indices, to improve sealing. A welding apparatus is available from Branson Ultrasonics Corp., of Danbury CT.

If desired, the valve cup 26 may be sealed to the container utilizing a press fit, interference fit, solvent welding, laser welding, vibration welding, spin welding, adhesive or any combination thereof. An intermediate component, such as a sleeve 54 or connector may optionally be disposed intermediate the valve cup 26 and neck 24 or top of the outer container 22. Any such arrangement is suitable, so long as a seal adequate to maintain the pressure results.

The pressurizable container 22 may be charged with an amount of product 42 which brings the pressure, as initially presented to the user 65, sufficient to dispense and substantially deplete the product 42 from the aerosol dispenser 20. The final pressure, after substantially all product 42 is depleted, is less than the initial pressure.

Product 42 may be charged into the container through the dispensing valve assembly 28, as is known in the art. When product 42 is charged into the container, the product 42 increases the pressure of the propellant 40. The increase in propellant 40 pressure occurs due to the increase in volume of the collapsible bag 32 if such a bag is used as a product delivery device. Likewise, the increase in propellant 40 pressure occurs due to the increase in the number of moles of product 42 in the outer container 22 if a dip tube 34 is selected. An aerosol dispenser 20 may be made according to commonly assigned US 2012/0292338A1; US 2012/0291911A1; and/or US 2012/0291912A1.

The pressure of the propellant 40 at the end of the first phase of manufacture may correspond to the pressure at the end of the usable life of the aerosol dispenser 20, herein referred to as the final pressure. The pressure of the propellant 40 at the end of the second phase of manufacture may correspond to the pressure as initially presented to the user 65.

The propellant 40 may be provided at a pressure corresponding to the final pressure of the aerosol dispenser 20 when substantially all product 42 is depleted therefrom. The propellant 40 may be charged to a pressure of less than or equal to 300, 250, 225, 210, 200, 175 or 150 kPa. The propellant 40 may be charged to a pressure greater than or equal to 50, 75, 100 or 125 kPa. The gage pressures cited herein are to be construed as the initial pressure inside the outer container 22, as manufactured and prior to first use.

Plural valves 28 may be used with a single outer container 22. This arrangement provides the benefit that product 42 and propellant 40, or disparate products 42, are mixed at the point of use, allowing synergistic results between incompatible materials. This arrangement also provides the benefit that delivery of the propellant 40 provides motive force to the product 42, often resulting in smaller particle size distributions. Smaller particle size distributions can be advantageous for uniform product 42 distribution and minimizing undue wetting.

The aerosol dispenser 20, and particularly the outer container 22 thereof, may have a burst pressure of at least 1100 kPa at 54.4 degrees C. and further may have a burst pressure of at least 1650 kPa at 20 degrees C. Meeting these burst pressures is believed to avoid the need for using DOT exemptions.

If desired, the outer container 22 may have a safety valve 50, to prevent catastrophic failure of the aerosol dispenser. By way of non-limiting examples, one suitable safety valve 50 may be spring loaded, responding to increased force against the spring due to the increased pressure on the spring from heating of product 42 and/or propellant 40. Another suitable safety valve 50 may be a duckbill valve 90, which opens from inside of the outer container 22 to ambient, upon reaching the cracking pressure of the safety valve 50. Such safety valves 50 are reusable, providing the benefit that the aerosol dispenser 20 can be refilled and reused, with the safety valve 50 intact.

The safety valve 50 may relieve radially inwardly towards a punt in the base. This directionality, including any inward direction with a radial vector component, provides the benefit of confining unexpected spray.

A single use safety valve may be used. Particularly, a rupture membrane may be used as the safety valve 50. The rupture membrane provides the benefit of single, destructive use, decreasing cost and being disposable once the rupture membrane acts to catastrophically relieve pressure as a single use safety valve 50. The rupture membrane type safety valve 50 may be a material weaker than that of the outer container 22, such as a foil or thin film. Alternatively, such a safety valve 50 may comprise a local thinned region, integral with the outer container 22. The thinned region may be made in the ISBM process used to make the outer container 22 or its preform, or material may be removed to provide a thinned region, for a rupture membrane type safety valve 50.

A safety valve 50 comprising a thinned region for the rupture membrane may be visible to the user 65 in ordinary use. A visible safety valve 50 provides the benefit that the user 65 is aware of the direction of release, should it occur. A safety valve 50 comprising a thinned region for the rupture membrane may not be visible to the user 65 in ordinary use. A safety valve 50 not visible in use provides the benefit of being aesthetically pleasing and easier decoration with labeling, indicia 55 and trademarks 56.

The safety valve 50 may comprise a blowout panel. The blowout panel may become totally detached from the outer container 22 upon over pressurization. Alternatively, the blowout panel may be joined to the outer container 22 by a living hinge. The blowout panel may be sized to provide for the desired rate of depressurization upon overpressurization. The living hinge joins the blowout panel to the outer container 22 in an integral manner, providing for ease of manufacturing. The living hinge may be disposed on the top of the safety valve 50. This arrangement deflects the propellant 40 downwardly, and away from the face of the user 65.

If desired, indicia 55 may be disposed on the blowout panel. The indicia 55 may alert the user 65 that the blowout panel is subject to opening upon overpressurization or may container other useful information.

A reusable safety valve 50 may be selected. Such a safety valve 50 may be created by disposing a localized energy receptor on the surface of the outer container 22. The energy receptor preferentially absorbs microwave energy during the heating of the aerosol dispenser 20, and locally increases the wall temperature relative to the balance of the container wall 22. Such a concentration of thermal energy in a localized area will reduce the modulus, so that mechanical failure from over-pressurization of the container 20 will occur at a lesser pressure than the burst pressure of the balance of the outer container 22. The benefit of such a safety valve 50 is that its size and position can be easily altered to meet the specific needs of a particular aerosol dispenser 20. The energy receptor safety valve 50 may be disposed on the shoulder 25 of the outer container, 22 to preferentially intercept microwaves from a magnetron/wave guide as positioned in a typical microwave oven 65.

Suitable microwave receptors for a safety valve 50 include $V_2O_5$ and $TiO_2$. The safety valve 50 may advantageously combine elements of both a rupture disc and a microwave receptor. For example, the safety valve 50 may comprise metal evaporated onto a plastic film. Prophetically, aluminum, tin oxide, chromium or magnesium deposited onto a polyester film with a resistivity of 1 to 300, or 1 to 10 ohms per square is suitable. Further disclosure is found in U.S. Pat. No. 4,267,420 and *Modern Microelectronics* by Dr. Fogiel (1972) pp. 94-100.

A reusable safety valve 50 may comprise a poppet valve having an integral spring, or a spring loaded safety valve 50 having a coil spring seated disc or a duckbill valve. One particularly prophetically reusable and suitable safety valve 50 comprises a one way degassing valve, as is commonly used for coffee bags. Such a degassing valve may employ a movable disc to relieve pressure upon demand. The disc moves in response to pressure from inside the aerosol dispenser 20, and reseats when the overpressure is relieved. A prophetically suitable degassing valve is available from Icone International Ltd. of Harrow, United Kingdom, as Valve V-101 or from Pacific Bag Inc. of Woodinville, WA under Series 101, 201 or 301. A degassing safety valve 50 prophetically provides the benefit of slow release, preventing catastrophic blowdown of an over-pressurization.

A single use or reusable safety valve 50 may discharge through the dispensing valve assembly 28 of a dip tube 34 product delivery device. Particularly, the seal of the dispensing valve assembly 28 may have a thinned or weakened region. Upon overpressurization, a mixture of propellant 40 and product 42 will breech the weakened region of the seal and enter the valve port(s). Upon entering the valve port(s), the mixture of propellant 40 and product 42 flows upwardly through the stem and to ambient.

Or the safety valve 50 may comprise a weakened region in the valve cup 26. This arrangement provides the benefit that upon overpressurization the safety valve 50 relieves into the actuator 30. By relieving into the actuator 30, direct spray onto the user 65 does not occur. If the cap 29 is in place, further containment may occur.

A single use or reusable safety valve 50 may also discharge through the dispensing valve assembly 28 of a bag 32 on valve product delivery device. Particularly, the seal of the dispensing valve assembly 28 may have one or more thinned or weakened regions. Upon overpressurization, product 42 will breech the weakened region of the seal and enter the valve port(s). Upon entering the valve port(s), the product 42 flows upwardly through the stem and to ambient. If desired, the seal may comprise TPE and have plural weakened regions. The plural weakened regions provide redundancy. Plural weakened regions may be the same or different to provide for different release rates or pressures.

A safety valve 50 discharging through the dispensing valve assembly 28 provides the benefit of preserving an outer container 22 for use without a safety valve 50. One of skill will understand that a safety valve discharging through the dispensing valve assembly 28 may be used in conjunction with another safety valve 50 discharging through the outer container 22.

Figure 3:
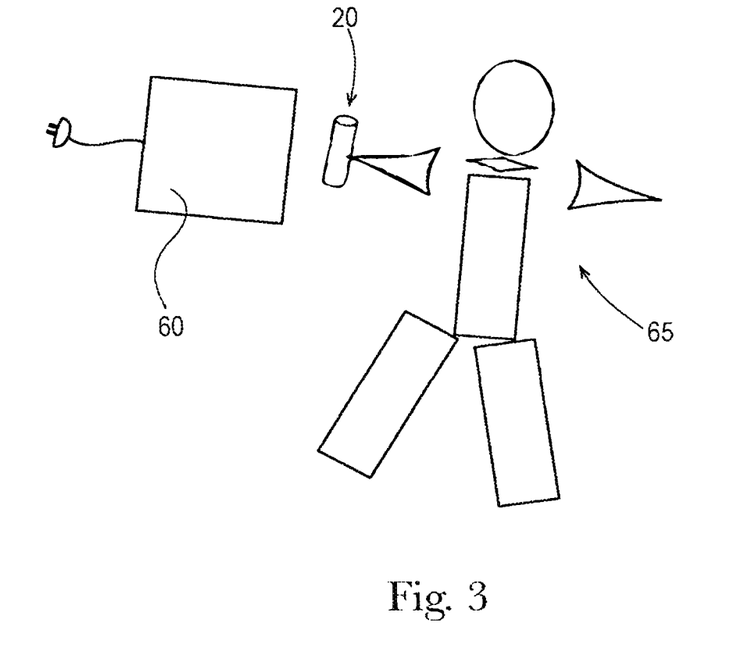
FIG. 3 is a schematic view of a person putting an aerosol dispenser according to the present invention into a microwave oven.

Referring generally to FIGS. 1-3, an aerosol dispenser 20, or pressurizable container therefor, according to the present invention may be microwavable. By microwavable, it is meant that the aerosol dispenser 20 may be placed in a microwave oven 60 and have microwave energy applied thereto during normal operation without arcing or undue damage to the aerosol dispenser 20. Microwave heating of the aerosol dispenser 20 or pressurizable outer container 22 therefor, provides for heating of the product 42 prior to dispensing.

Microwave heating may be accomplished in a common, residential microwave oven 60 or a commercial microwave oven 60. A microwave oven 60 is an electrically operated oven which uses high-frequency electromagnetic waves that penetrate food, and other consumer products, causing their molecules to vibrate and thereby generate heat, warming that consumer product.

As used herein, heating in a microwave oven 60 refers to adding energy, with or without a respondent change in temperature. Warming in a microwave oven 60 further refers to raising the temperature of a product 42, propellant 40 and/or the outer container 22. For safety one may wish to avoid having flammable materials in a microwave oven 60.

Microwave ovens 60 use frequencies in one of the bands specifically reserved for such purpose. Consumer microwave ovens 60 often use 2.45 (GHz) and a wavelength of 12.2 centimeters. Larger industrial/commercial ovens often use 915 (MHz)—32.8 centimeters. Additional bands not used for microwave cooking may be suitable. For example, bands centered on 5.8 GHz and 24.125 GHz are prophetically feasible, but may have high cost of power generation at these frequencies. A band centered on 433.92 MHz, may create interference and is only available in some countries. A consumer microwave oven 60 may consume about 1100 W of electricity to produce about 700 W of microwave power for an efficiency of about 64%. The microwave oven 60 is connected to any suitable power supply, such as an AC mains source.

These electromagnetic waves induce polar molecules in the food, or other consumer product to rotate and produce thermal energy in a process known as dielectric heating. Many molecules (such as those of water) are electric dipoles, with a partial positive charge at one end and a partial negative charge at the other. Such dipoles rotate to align with the alternating electric field of the microwaves. Rotating molecules collide with other molecules producing vibrations, and dispersing energy as heat.

As used herein, a microwave oven 60 includes a convection microwave oven 60, which is is a combination of a standard microwave and a convention oven. Convection microwave ovens 60 have exposed heating elements, such as high power quart halogen bulbs. These bulbs heat the surface of the outer container 22 with infrared radiation, further heating the product 42 therein.

Without being bound by theory, it is believed that microwave heating of the aerosol dispenser will heat certain propellants 40. For example, and particularly, it is believed that hydrocarbon propellant 40 and more particularly a hydrofluoroolefin propellant 40 in an aerosol dispenser 20 will be heated by a microwave oven 60. Without being bound by theory it is believed that an air or nitrogen propellant 40 will not significantly respond to microwave radiation.

This distinction indicates it is desirable to use a hydrocarbon propellant 40 and/or a hydrofluoroolefin propellant 40 in an aerosol dispenser 20 to be microwaved. The heating of an aerosol dispenser 20 having such hydrocarbon propellant 40 and/or hydrofluoroolefin propellant 40 will beneficially cause further retention of heat after the microwave process is complete, ostensibly due to the thermal mass.

In a different embodiment, and without being bound by theory, it is believed that microwave heating of an aerosol dispenser having air or nitrogen propellant 40 would cause the microwave energy to be more focused on the product 42 and not on the propellant 40. Thus the propellant will not be heated, and the product 42 beneficially heat to the desired temperature more quickly.

Microwave ovens 60 heat foods, and like consumer products, quickly and efficiently because excitation is fairly uniform in the outer 25-38 mm of a homogeneous, high water content consumer product 42. Thus a microwave oven 60 may be advantageously used in accordance with the present invention.

Particularly, a microwave oven 60 may be used with an aerosol dispenser 20 having an outer container 22 of less than 76 mm, less than 50 mm, and less than 38 mm or less than 25 mm, to promote highly efficient heating in a generally cylindrical outer container 22. This geometry allows effective microwave penetration through substantially all of the product 43, promoting fast and uniform heating thereof. Thus, prophetically, an outer container 22 having a diameter greater than about 80 mm is less desirable, due to the poorer heating expected from such diameter.

The aerosol dispenser 20 may have an axial length suitable to hold the desired volume of product 42. The axial length may be less than 35, 25, 20 15 or 10 cm centimeters, to allow the aerosol dispenser 20 to stand vertically in a convention microwave oven 60 during heating.

Heating of the product 42 prior to dispensing may be desirable if the product 42 is applied to the skin, becomes more efficacious at lower viscosities, or is to be eaten. By heated it is meant that the product 42 has a temperature of 22, 25, 30, 35, 40, 45, 50, 60, 70, 80 or 90 degrees C., but less than the boiling point or flash point of that product 42.

Suitable skin contact products 42 to be heated and dispensed in a warm state from an aerosol dispenser 20 according to the present include, without limitation, lotions, emollients, suntan lotions, insecticides, bacteriacides, viricides, cleansers, antibacterials, shave cream, etc. Such products 42 should not be heated to the point where discomfort occurs when the product 42 is dispensed from the aerosol dispenser 20 and applied to the skin.

Suitable food products 42 to be heated and dispensed in a warm state from an aerosol dispenser 20 according to the present generally include those foods which can provide flavor, or toppings to other foods. Such foods include condiments, sauces, dressings, juices, and other foods softened or warmed prior to serving. Specific foods can include, without limitation, gravy, salad dressing, milk, cheese, chocolate, fudge, marshmallow, tea, coffee, butter, mashed potatoes, oils, citrus juices, vinegar, etc. Such products 42 should not be heated to the point where discomfort occurs when the product 42 is ingested.

The user 65 may place the aerosol dispenser 20 in the microwave oven 60, and heat to the desired temperature of the product(s) 42 in the aerosol dispenser 20. The user 65 then dispenses the product(s) 42 in a warm/heated state under the propellant 40 pressure, by selectively using the actuator 30. If the product(s) 42 become unduly cool, then the user 65 places the aerosol dispenser 20 in the microwave oven 60 again, and repeats the process.

The aerosol dispenser 20 may have an indicium 55/indicia 55 thereon, the terms being used interchangeably. The indicia 55 may provide instructions for use involving microwave heating of the aerosol dispenser 20 and or product(s) 42 therein, particularly as relates to preferred heating times, instructions for deployment of the product(s) 42 once heated, or simply indicate the aerosol dispenser 20 is suitable for and/or safe for microwave heating in a microwave oven 60. The indicia may comprise printed words, graphics, photographs and a combination thereof.

The indicia 55 may instruct the user 65 as to how to dispense and use the heated product 42, upon dispensing. For example, the heated product 42 may comprise a first food which is dispensed warm onto a second food. The indicia 55 may further provide indication that the aerosol dispenser 20 is entirely recyclable without separating into substituent components and more particularly entirely Stream 1 recyclable without separating into substituent components.

Such indicia 55 may be optionally disposed on the outer container 22, on packaging for the aerosol dispenser 20 which packaging is later discarded, on the internet or in other literature. Indicia 55 distributed by the internet may be viewed on a phone, tablet or computer. If the indicia 55 are disposed on the outer container 22, such indicia may be smaller than, or otherwise less prominent than, a trademark 56 associated with the product 42.

If desired, the indicia 55 may comprise a thermochromic ink. The thermochromic ink may provide a visual que that the aerosol dispenser 20 has been sufficiently heated in the microwave oven 60, or otherwise, and/is being overheated. The thermochromic indicia 55 may then signal to the user 65 it is time to stop the heating process. Suitable thermochromic indicia 55 may be made from liquid crystals and leuco dye.

A common microwave oven 60, has a turntable which rotates the object being heated about the vertical axis, to promote more uniform heating. If desired, the thermochromic indica 55 may be disposed in a band which circumscribes aerosol dispenser, 20 and particularly the outer container 22. This arrangement provides the benefit that when the aerosol dispenser 20 is heated and concomitantly rotated, the user 65 can see the thermochromic indica 55 from any angle the aerosol dispenser 20 may assume when the indicia 55 indicate a desired temperature has been reached.

With particular reference to FIG. 2B, thermochromic indica 55 may be disposed on a component not associated with the aerosol dispenser 20 in use. For example, thermochromic indicia 55 may be disposed on a cap 29. The cap 29 may optionally be transparent, and may be discarded after a single use, or may be retained for subsequent uses.

If desired, differential temperature thermochromic indica 55 may be used. For example, discrete thermochromic indicia 55 may be circumferentially staggered about the aerosol dispenser 20, such as around the cap 29. A first thermochromic indicium 55 may visually indicate at a first temperature. A second thermochromic indicium 55 may visually indicate at a second, and greater, temperature. A third thermochromic indicium 55 may visually indicate at a third, and yet greater, temperature, etc.

The differential temperature indicia 55 may designate a first desired temperature has been reached, a second desired temperature has been reached, etc. This arrangement allows the user 65 to warm the product 42 to a temperature suitable for that particular user 65 or usage.

If the aerosol dispenser 20 comprises a bag 32 on valve 28 configuration and the outer container 22 is transparent or translucent, thermochromic indica 55 may be disposed on the bag 32. Upon heating such thermochromic indicia 55 will provide an indication that not only has sufficient heating of the propellant 40 occurred, but sufficient heating of the product 42 has also occurred. This arrangement provides the benefit that product 42 heating is more closely monitored and designated as being heated to the desired temperature.

Likewise, thermochromic indicia 55 may be disposed on a dip tube 34. If a transparent or translucent the outer container 22 is used, the thermochromic dip tube 34 will indicate to the user 65 that desired temperature has been reached. This arrangement provides the benefit that internal heating is more closely monitored and designated as being heated to the desired temperature.

In yet another embodiment, the trademark 56 may comprise thermochromic ink. The trademark 56 may not be visible at room temperature. Upon heating to a desired temperature, the trademark 56 may then visually appear.

Suitable thermochromic indicia 55 include leuco dyes. Leuco dyes provide the benefit of being reversible, in response to temperatures returning to ambient and can change to clear within a particular temperature range. A suitable leuco dye indicia can respond to a temperature change of about 3 degree C. Other suitable indicia 55 comprise irreversible thermochromic inks. Such inks can provide a gradual color change as temperatures increase, warning the user 65 before overheating occurs. Yet, other suitable indicia 55 comprise thermochromic liquid crystals of optically active mixtures of organic temperature sensitive chemicals. Such indica 55 may comprise sequential rainbow color change as temperature increases, alerting the user 65 to small temperature changes, as schematically illustrated in the bottom indicia 55 of FIG. 1. Or the thermochromic liquid crystals may provide a single color change above a predetermined transition temperature, for simplicity. Prophetically, suitable indicia 55 are available from LCR Hallcrest LLC of Glenview, IL, as schematically illustrated in the indicia 55 on the bag 32 of FIG. 2A.

In certain executions, the user 65 may wish to warm the product 42 by heating in a microwave oven 60 to provide a desired tactile feel, for food consumption or for cleaning efficacy. In other executions, the user 65 may wish to warm the outer container 22 by heating in a microwave oven 60, to provide a more pleasant tactile feel.

The user 65 may place the aerosol dispenser 20, and the product 42 therein in a microwave oven 60. The user 65 may operate the microwave oven 60 to heat and warm product 42 therein and/or provide a more comfortable tactile feel to the outer container 22. The user 65 may then stop operation of the microwave oven 60, or operation may automatically stop based upon a timer, etc. The user may remove the aerosol dispenser 20 from the microwave oven 60. The user may affirmatively stop operation in response to a thermochromic change in indicia 55 and before the safety valve 50 is actuated.

In various embodiments, the invention may be described according to the following paragraphs.

A. A microwavable aerosol dispenser comprising:
an outer container having a closed end bottom at a first end and an open neck at a second end and defining an outer container volume therein,
a product delivery device for providing a flow path to ambient for a product disposed in said outer container,
product disposed in fluid communication with said product delivery device,
a dispensing valve assembly for selectively dispensing said product from said aerosol dispenser,
propellant disposed within said outer container and pressurizing said product to a gage pressure greater than ambient, to provide for selective delivery of said product from the aerosol dispenser, and
indicia associated with said aerosol dispenser, said indicia indicating said aerosol dispenser is suitable for heating in a microwave oven.

B. A microwavable aerosol dispenser according to Paragraph A wherein said indicia comprises instructions for heating said aerosol dispenser in a microwave oven.

C. A microwavable aerosol dispenser according to Paragraph A wherein said indicia comprises instructions for heating said aerosol dispenser in a microwave oven, said indicia being disposed on said outer container.

D. A microwavable aerosol dispenser according to Paragraph A wherein said product delivery device comprises a bag on valve, said product being disposed in said bag, said propellant being disposed between said bag and said outer container.

E. A microwavable aerosol dispenser according to Paragraph A wherein said product delivery device comprises a bag on valve, said product being disposed in said bag, said propellant being disposed between said bag and said outer container and wherein said indicia comprises thermochromic indicia disposed on said bag.

F. A microwavable aerosol dispenser according to Paragraph A wherein said product delivery device comprises a dip tube, and said product and said propellant are intermixed.

G. A microwavable aerosol dispenser according to Paragraph A, said outer container having a diameter less than or equal to about 7.62 cm and a volume ranging from about 118 cc to about 1000 cc and said gage pressure is less than about 965 kPA @ 50 C.

H. A microwavable aerosol dispenser according to Paragraph A, further comprising indicia indicating said aerosol dispenser is entirely class 1 recyclable as defined by the Society of the Plastics Industry.

I. A microwavable aerosol dispenser according to Paragraph A, wherein each of said outer container, dispensing valve assembly and product delivery device is selected from the group consisting essentially of class 1 recyclable materials as defined by the Society of the Plastics Industry J. A microwavable aerosol dispenser according to Paragraph A wherein a first indicia is disposed on said outer container, and a second indicia is disposed on the internet, said first indicia and said second indicia both indicating said aerosol dispenser is suitable for heating in a microwave oven.

K. A microwavable aerosol dispenser according to Paragraph A further comprising a disposable cap, and comprising thermochromic indicia disposed on said disposable cap.

L. A microwavable aerosol dispenser comprising:
an outer container having a closed end bottom at a first end and an open neck at a second end and defining an outer container volume therein,
a product delivery device for providing a flow path to ambient for a product disposed in said outer container,
product disposed in fluid communication with said product delivery device,
a dispensing valve assembly for selectively dispensing said product from said aerosol dispenser, and
propellant disposed within said outer container and pressurizing said product to a gage pressure greater than ambient, to provide for selective delivery of said product from the aerosol dispenser and
first indicia associated with said aerosol dispenser, said first indicia qualitatively indicating temperature in response to heating of said aerosol dispenser in a microwave oven.

M. A microwavable aerosol dispenser according to Paragraph L wherein said first indicia is not visible until said aerosol dispenser is heated in a microwave oven, said indicia becoming visible and providing a warning to a user upon heating in a microwave oven.

N. A microwavable aerosol dispenser according to Paragraph L wherein said product comprises a food suitable for human consumption.

O. A microwavable aerosol dispenser according to Paragraph L comprising plural thermochromic indicia, said plural thermochromic indicia indicating said product is warmed to a desired temperature range in response to heating in a microwave oven.

P. A microwavable aerosol dispenser according to Paragraph L further comprising a second indicia, said second indicia comprising thermochromic indicia indicating a trademark.

Q. A method for dispensing a heated product from an aerosol dispenser, said method comprising the steps of:
providing an aerosol dispenser having an outer container having a closed end bottom at a first end and an open neck at a second end and defining an outer container volume therein, a product delivery device for providing a flow path to ambient for a product disposed in said outer container, product disposed in fluid communication with said product delivery device, a dispensing valve assembly for selectively dispensing product from said aerosol dispenser, propellant disposed within said outer container and pressurizing said product to a gage pressure greater than ambient, to provide for selective delivery of said product from the aerosol dispenser, and
providing a microwave oven connected to a power supply,
disposing said aerosol dispenser in said microwave oven and operating said oven to heat said product,
removing said aerosol dispenser from said microwave oven, and
dispensing said heated product from said aerosol dispenser using said valve.

R. A method for dispensing a heated product from an aerosol dispenser according to Paragraph Q wherein said heated product comprises a first food.

S. A method for dispensing a heated product from an aerosol dispenser according to Paragraph Q wherein said heated product comprises a first food, and further comprising the step of providing instructions for dispensing said heated product onto a second food.

T. A method for dispensing a heated product from an aerosol dispenser according to Paragraph Q, said method further comprising the step of reading instructions for heating said product in said microwave before placing said aerosol dispenser in said microwave oven.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" and a pressure disclosed as "about 1100 kPa" is intended to include 1103.2 kPa.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A microwavable aerosol dispenser comprising:
an outer container having a closed end bottom at a first end and an open neck at a second end and defining an outer container volume therein;
a product disposed in said outer container;
a product delivery device for providing a flow path to ambient for the product disposed in the outer container, wherein the product delivery device is selected from the group consisting of: a collapsible bag, a dip tube, a piston, and combinations thereof;
a dispensing valve assembly for selectively dispensing the product from the aerosol dispenser;

propellant disposed within the outer container and pressurizing the product to a gage pressure greater than ambient, to provide for selective delivery of the product from the aerosol dispenser, wherein the outer container, the product delivery device, and the dispensing valve assembly are polymeric;

differential temperature indicia associated with the aerosol dispenser, one or more indicia indicating the aerosol dispenser is suitable for heating in a microwave oven, wherein the one or more indicia comprises thermochromic indicia, wherein the thermochromic indicia is disposed in a band that circumscribes the aerosol dispenser, and wherein the thermochromic indicia is displayed on an internet where the thermochromic indicia is viewed on a phone or tablet or computer and is configured to indicate when to stop heating the aerosol dispenser in the microwave.

2. The microwavable aerosol dispenser according to claim 1 wherein the one or more indicia comprises instructions for heating the aerosol dispenser in the microwave oven.

3. The microwavable aerosol dispenser according to claim 2 wherein the thermochromic indicia is disposed on the outer container.

4. The microwavable aerosol dispenser according to claim 1 wherein the product is disposed in the bag, the propellant is disposed between the bag and the outer container.

5. The microwavable aerosol dispenser according to claim 1 wherein the product is disposed in the bag, the propellant is disposed between the bag and the outer container and wherein the thermochromic indicia is disposed on the bag.

6. The microwavable aerosol dispenser according to claim 1 wherein the product and the propellant are intermixed.

7. The microwavable aerosol dispenser according to claim 1, the outer container having a diameter less than or equal to 7.62 cm and a volume ranging from 118 cc to 1000 cc and the gage pressure is less than 965 kPA @ 50 C.

8. The microwavable aerosol dispenser according to claim 1, further comprising a second indicia, the second indicia indicating the aerosol dispenser is entirely class 1 recyclable as defined by the Society of the Plastics Industry.

9. The microwavable aerosol dispenser according to claim 1, wherein each of the outer container, dispensing valve assembly, and product delivery device is selected from the group consisting essentially of class 1 recyclable materials as defined by the Society of the Plastics Industry.

10. The microwavable aerosol dispenser according to claim 1 further comprising a disposable cap, and wherein the thermochromic indicia is disposed on the disposable cap.

* * * * *